July 31, 1956
M. C. KINCAIDE
2,756,655
HYDRAULIC BOOSTER
Filed Sept. 21, 1951
2 Sheets-Sheet 1
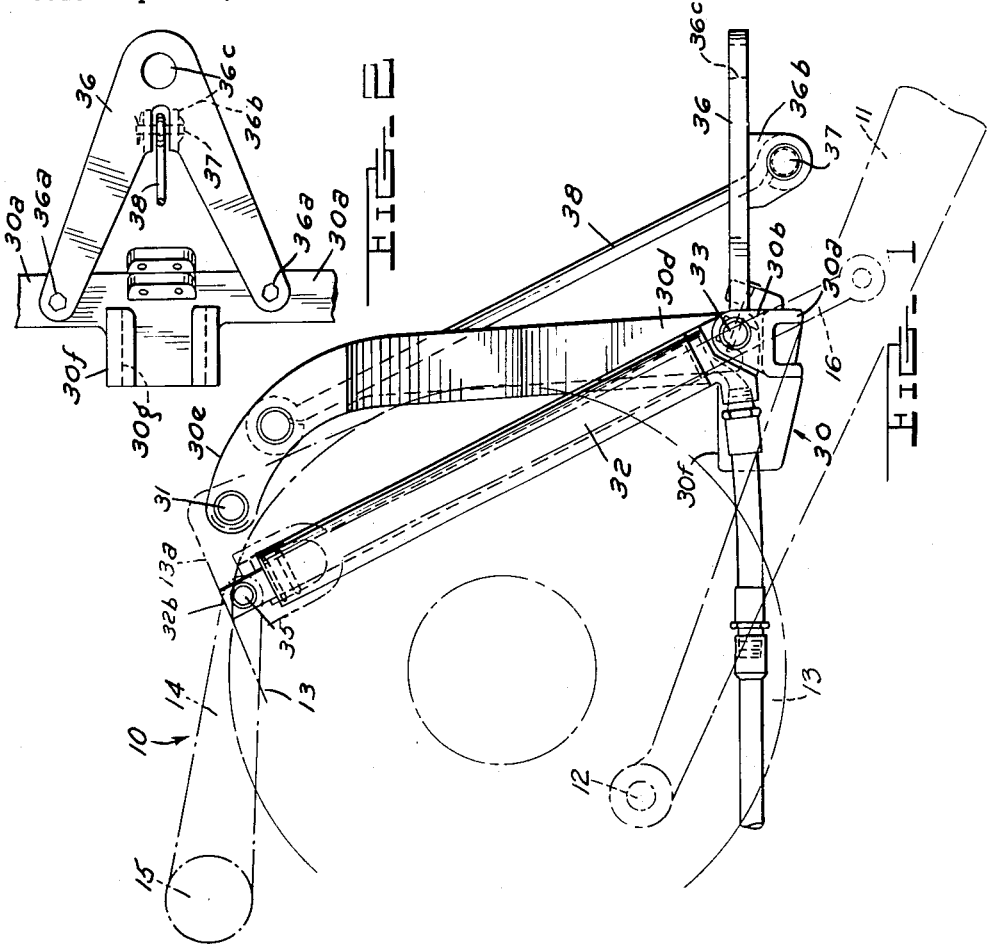
INVENTOR.
MERRILL C. KINCAIDE
ATTORNEY

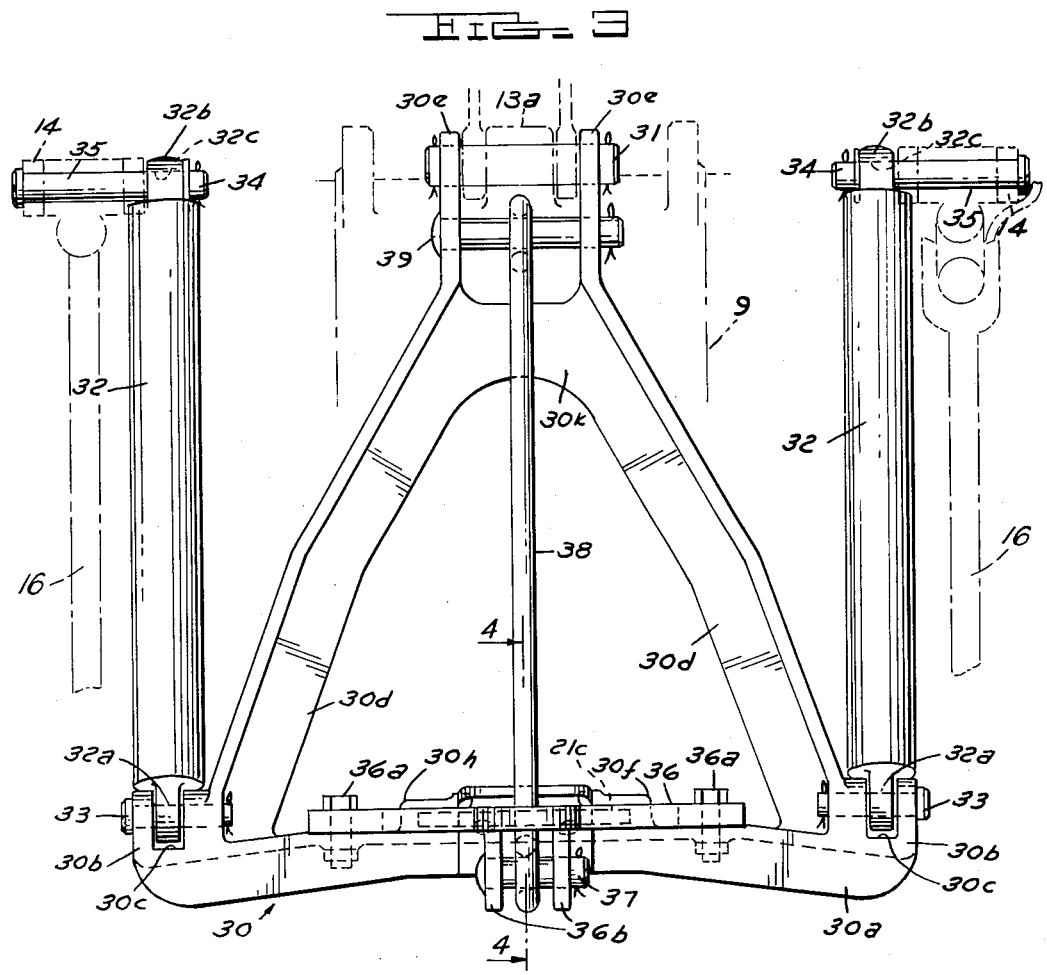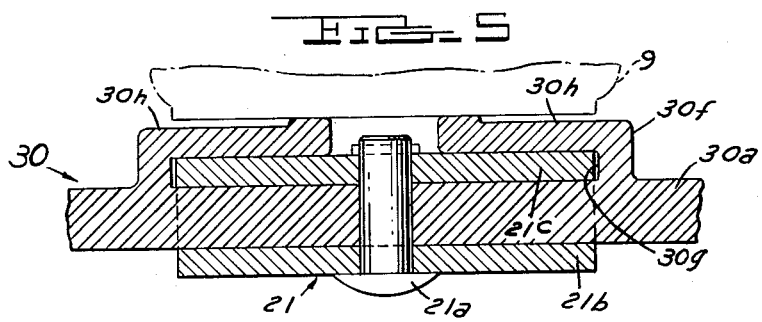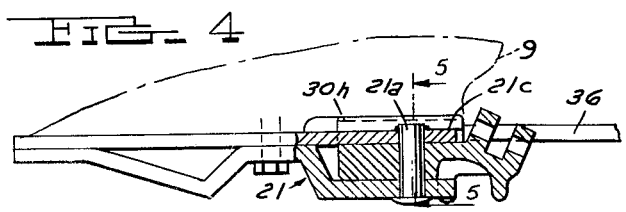

United States Patent Office

2,756,655
Patented July 31, 1956

2,756,655
HYDRAULIC BOOSTER

Merrill C. Kincaide, Detroit, Mich., assignor, by mesne assignments, to Ford Motor Company, Dearborn, Mich., a corporation of Delaware Application September 21, 1951, Serial No. 247,732

4 Claims. (Cl. 97—46.35)

This invention relates to a hydraulic booster for tractor carried power-lifted implements.

Many present day tractors have power-lifted hitch linkages upon which various sorts of implements may be mounted for transporting such implements as well as for utilizing the power-lifted linkage for working the implement.

The ordinary usage of implements so mounted on a tractor and powered by the tractor lifting apparatus is generally satisfactory; however, at some time or other a need usually arises for additional lifting force which, when combined with that of the tractor's power-lifting apparatus, will permit the implement to be utilized for heavier than the ordinary work.

A few of the implements capable of being mounted on and operated by the power-lifted links of a tractor include material loaders, scoops, buck rakes, heavy disc harrows, grain drills, multi-bottom plows and other similar tools. In many instances the load carrying capacity of the tractor is seldom approached by the weight of the implements and their load when mounted on the tractor. Accordingly, if additional lifting power is provided, the load carrying capacity of the tractor could then be appreciably increased.

Accordingly, it is an object of this invention to provide an auxiliary power-lift for a tractor having power-operated lift mechanism for increasing the lift capacity of such lifting mechanism.

Another object of this invention is to provide an auxiliary hydraulic booster for a tractor of well-known make having a power-lifted hitch linkage.

The specific nature of this invention, as well as other objects and advantages thereof, will become apparent to those skilled in the art from the following detailed description, taken in conjunction with the attached sheets of drawings on which, by way of preferred example only, is illustrated an embodiment of this invention.

On the drawings:

Figure 1 is a diagrammatic side elevation of a hydraulic booster unit of the present invention mounted on a tractor, portions of the tractor being omitted and other portions of the tractor being indicated in broken lines.

Figure 2 is a fragmentary plan view of the booster unit of Figure 1, showing a hitch for trailed implements mounted on the booster unit frame.

Figure 3 is an enlarged rear elevation of the booster unit, the differential housing and connecting rods being indicated in broken lines.

Figure 4 is a fragmentary longitudinal vertical section taken along the line 4—4 of Figure 3.

Figure 5 is an enlarged vertical section taken along the line 5—5 of Figure 4.

As shown on the drawings:

In the practice of this invention, a tractor 10 of well-known make having a pair of laterally spaced power-lifted hitch links 11 is preferably utilized. High links 11 are pivoted at transversely spaced points 12 on the tractor axle housing 13. A shaft 15 is journaled in the upper portion of the tractor differential housing which is rotated by a built-in hydraulically operated mechanism (not shown) supplied with fluid by a pump powered by the tractor motor. A pair of rocker arms 14 are respectively secured to the ends of shaft 15 and such rocker arms 14 are respectively secured to hitch links 11 by connecting rods 16, thus rotary movement of rocker arms 14 effects the vertical lifting of links 11.

As earlier pointed out, the force applied to hitch links 11 through rocker arms 14 is normally sufficient to properly operate any implement mounted on the hitch links. There is frequently a need, however, for additional power as in the case of a rear mounted manure loader, for example, when breaking a fork load away from the pile of manure. Accordingly, there will now be described a hydraulically operated booster unit for use in conjunction with the power-lifted hitch links 11 to provide additional lifting force when needed.

Referring particularly to Figures 1 and 3, there is shown a frame 30 which is of a unitary cast construction. Frame 30 comprises a substantially horizontal base member 30a and on its ends there are respectively provided a pair of upstanding integral lugs 30b. The lugs 30b are bifurcated by a vertical groove 30c, for a purpose to be presently explained. A pair of upwardly converging strut members 30d of substantially angle shaped configuration are integrally joined at their lower ends to the inner ends of the upstanding lugs 30b and to the top portion of horizontal bar 30a. Struts 30d are integrally joined at their upper ends, as at 30k, and a pair of vertical transversely spaced strut extensions 30e are integrally formed on the top thereof. The upstanding strut extensions 30e are transversely apertured to permit mounting of such ends on an upstanding lug 13a provided on top of the tractor differential housing 9. It will be noted that the ends 30e of struts 30d are forwardly curved, as best shown in Figure 3, to facilitate connection of the frame 30 to lug 13a as will be presently described.

The horizontal member 30a is of substantially channel shaped configuration, as best shown in Figure 3, and an integral centrally disposed and forwardly facing projection 30f is provided on the horizontal member 30a. The projection 30f is of substantially rectangular configuration and an inverted T-shaped horizontal groove 30g is provided in the projection 30f. T slot 30g thus defines a pair of transversely spaced inwardly projecting lips 30h which permits mounting of the frame 30 on a more or less conventional clevis hitch 21 of tractor 10, provided for towing implements and vehicles. Clevis 21 essentially comprises two vertically spaced plates 21b and 21c and such plates are secured to the bottom surface of the differential housing 9 of tractor 10 in a well-known manner. Hence, the T-shaped groove 30g may be conveniently engaged with the plate 21c of clevis 21 with the overhanging lips 30h resting on top of plate 21c. It should be mentioned here that the lips 30h are so constructed as to provide a snug fit between the bottom surface of differential housing 9 and clevis plate 21c, thereby substantially eliminating undue play of frame 30 when mounted on the rear end of the tractor. The tractor clevis pin 21a, when inserted through suitable aligned vertical holes in the clevis 21 and in the horizontal member 30a of frame 30, secures the bottom portion of frame 30 to clevis 21. When the projection 30f is assembled to clevis 21 the arcuate ends of extensions 30e of struts 30d are readily secured to lug 13a by a transverse pin 31 and the frame 30 is thus rigidly secured to the tractor.

A pair of hydraulically operated cylinders 32, respectively having on one of their ends a pair of integral apertured lugs 32a, are pivotally mounted to frame 30. The apertured lugs 32a fit within the bifurcation 30c provided in the upstanding lugs 30b and a pair of transverse headed pins 33 respectively pivotally mount the lower ends of the hydraulic cylinders 32 to frame 30, pins 33, of course, being inserted through suitable horizontal apertures respectively provided in the lugs 30b. The cylinders 32 are respectively provided with rod-like pistons 32b which are slidably received by the cylinders 32 and are forced outwardly by hydraulic pressure, as will be explained. The upper ends of pistons 32b are transversely apertured, as shown at 32c, and a pair of horizontal pins 35 provided in the ends of rock arms 14 are insertable through the apertures 32c of pistons 32b whereby the upper ends of pistons 32b are pivotally secured to the ends of rock arms 14. A cotter pin 34 inserted through a suitable transverse aperture in the end of each pin 35 prevents displacement of such pins.

A V-shaped hitch plate 36 is centrally secured by a pair of bolts 36a to the horizontal member 30a of frame 30. Hitch plate 36 projects rearwardly from frame 30 and is horizontally disposed. A pair of transversely spaced integral lugs 36b are provided on the underside of the V-shaped hitch plate adjacent the inner vertex thereof and such depending lugs are transversely apertured to receive a transverse pin 37. A rod-like brace 38 having eye shaped ends has one of its ends mounted on the pin 37. The other end of brace 38 surrounds a pin 39 transversely supported by the upstanding arms 30e, pin 39 being disposed just below the pin 31. Thus the rear extremity of hitch plate 36 adequately supports vertical loads placed upon such hitch. A suitable vertical aperture 36c is provided adjacent the rearmost apex of the hitch plate 36 to permit fastening a trailed implement or vehicle by a suitable clevis pin.

Rock arms 14 are connected to the hitch links 11 of tractor 10 in the usual manner. Hence, in this modified construction the use of the additional links 25, previously described, which connect the hydraulic booster cylinders 19 to the hitch links 11 is eliminated.

It is thus readily apparent that not only is the normal lift power of hitch links 11 available, but the additional lift power provided by the hydraulic booster cylinders is also added to that already available from the tractor's hydraulic mechanism. It should be mentioned here that rock arms 14 and hence hitch links 11 are concurrently manually controlled by a hydraulic control lever provided on the outside of the tractor (not shown). If preferred, however, booster cylinders 19 and/or 32 may be controlled by a separate valve mechanism (not shown) which nevertheless utilizes the pressured fluid produced by the built-in hydraulic system of the tractor. With the latter control, the hydraulic cylinder boosters may then be used only when additional power is needed to break loose a load or for such other need as may arise.

Hence, it will appear from the foregoing description that there is here provided an additional power-lift unit for a tractor which may be conveniently operated by the tractor pressured source of hydraulic fluid. The booster unit of this invention provides considerable additional lifting force to the hitch links which greatly increase the capacity of an implement mounted on the hitch links.

It will be appreciated that the hydraulic booster unit of this invention can be readily applied to any tractor having a lifting linkage adapted for mounting implements thereon. The use of this hydraulic booster unit is not limited to any one particular implement but may be utilized with any implement which requires more than the usual available amount of lifting force for optimum operation.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with tractors having a rear axle housing, a pair of laterally spaced trailing hitch links pivoted to said housing, a top link bracket mounted on the top central portion of said housing and a hitch bracket mounted on said housing below said top link bracket; a pair of laterally spaced power-lifted crank arms mounted in said housing in overlying relationship respectively to said hitch links and a pair of links connecting said crank arms and said hitch links; the improvements comprising a vertical frame structure, means for mounting the lower portions of said frame structure on said hitch bracket, means for mounting the top portions of said frame structure on said top link bracket, a pair of hydraulic cylinders, means for mounting said cylinders respectively to laterally spaced portions of said frame, means for respectively operatively connecting said cylinders to said crank arms, and means for concurrently hydraulically energizing said cylinders.

2. The combination defined in claim 1 plus a rearward projection on the lower portions of said frame structure, and means on said rearward projection for connecting a trailed implement.

3. For use with tractors having a rear axle housing, a pair of laterally spaced trailing hitch links pivoted to said housing, a top link bracket mounted on the top central portion of said housing and a hitch bracket mounted on said housing below said top link bracket, a pair of laterally spaced power-lifted crank arms mounted in said housing in overlying relationship respectively to said hitch links and a pair of links connecting said crank arms and said hitch links; the improvements comprising a vertical frame structure having a pair of laterally spaced lug members on its lower portion, means for mounting the lower portion of said frame structure on the hitch bracket, means for mounting the top portion of said frame structure on the top link bracket, a pair of hydraulic cylinders, means for respectively pivotally mounting the lower ends of said hydraulic cylinders to said lug members, means for respectively operatively connecting said cylinders to said crank arms, and means for concurrently hydraulically energizing said cylinders.

4. For use with tractors having a rear axle housing, a pair of laterally spaced trailing hitch links pivoted to said housing, a top link bracket mounted on the top central portion of said housing and a hitch bracket mounted on said housing below said top link bracket, a pair of laterally spaced power-lifted crank arms having yoke shaped ends mounted in said housing in overlying relationship respectively to said hitch links, a pair of links connected at their lower ends to the hitch links; the improvements comprising a pair of pins respectively traversing said crank arm yoke ends to respectively mount the links within the yokes, the pins projecting laterally beyond one edge of the yokes, a vertical frame structure having a pair of laterally spaced lug members on its lower portion, means for mounting the lower portion of said frame structure on the hitch bracket, means for mounting the top portion of said frame structure on the top link bracket, a pair of hydraulic cylinders, means for respectively pivotally mounting the lower ends of said hydraulic cylinders to said lug members and means for respectively pivotally mounting the upper ends of said hydraulic cylinders on said projecting pin ends, and means for concurrently hydraulically energizing said cylinders.

References Cited in the file of this patent

UNITED STATES PATENTS

| 2,198,196 | Goldup | Apr. 23, 1940 |
| 2,223,002 | Ferguson | Nov. 26, 1940 |
| 2,445,145 | Love | July 13, 1948 |
| 2,445,260 | Brimhall | July 13, 1948 |
| 2,580,532 | Dugger | Jan. 1, 1952 |
| 2,590,011 | Hawkins | Mar. 18, 1952 |
| 2,593,679 | Kaupke | Apr. 22, 1952 |
| 2,597,692 | Wills et al. | May 20, 1952 |
| 2,629,305 | Schenewolf | Feb. 24, 1953 |
| 2,629,306 | Rusconi | Feb. 24, 1953 |
| 2,658,438 | Seng | Nov. 10, 1953 |
| 2,682,819 | Morkoski | July 6, 1954 |